US010300558B2

(12) United States Patent
Sako et al.

(10) Patent No.: US 10,300,558 B2
(45) Date of Patent: May 28, 2019

(54) LASER PROCESSING MACHINE AND LASER CUTTING METHOD

(71) Applicant: AMADA HOLDINGS CO., LTD., Kanagawa (JP)

(72) Inventors: Hiroshi Sako, Kanagawa (JP); Hiroaki Ishiguro, Kanagawa (JP); Akihiko Sugiyama, Kanagawa (JP); Yuya Mizoguchi, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 15/578,893

(22) PCT Filed: Apr. 26, 2016

(86) PCT No.: PCT/JP2016/063041
§ 371 (c)(1),
(2) Date: Dec. 1, 2017

(87) PCT Pub. No.: WO2016/199514
PCT Pub. Date: Dec. 15, 2016

(65) Prior Publication Data
US 2018/0169792 A1    Jun. 21, 2018

(30) Foreign Application Priority Data

Jun. 10, 2015 (JP) ................................. 2015-117126

(51) Int. Cl.
*B23K 26/06*    (2014.01)
*B23K 26/064*    (2014.01)
(Continued)

(52) U.S. Cl.
CPC ............ *B23K 26/38* (2013.01); *B23K 26/064* (2015.10); *B23K 26/067* (2013.01);
(Continued)

(58) Field of Classification Search
CPC .. B23K 26/38; B23K 26/0648; B23K 26/142; B23K 26/0665; B23K 26/08; B23K 26/0676; B23K 26/067; B23K 26/064
See application file for complete search history.

(56) References Cited

U.S. PATENT DOCUMENTS 5,140,600 A * 8/1992 Rebhan ................. B23K 26/06
372/20
5,498,851 A    3/1996 Hayashi et al.
(Continued)

FOREIGN PATENT DOCUMENTS

CN    101378875    3/2009
CN    102448660    5/2012
(Continued)

OTHER PUBLICATIONS

Lentjes et al., "Metal Cutting with Multi kW Diode Laser", Feb. 2012, Verlag GMBH, www.laser-journal.de., pp. 31-33.*
(Continued)

*Primary Examiner* — Geoffrey S Evans
(74) *Attorney, Agent, or Firm* — Greenblum & Bernstein, P.L.C.

(57) ABSTRACT

A laser processing machine includes a laser oscillator. The laser oscillator excites a laser beam having a wavelength in a 1 μm band or a shorter wavelength band. One process fiber transmits the laser beam emitted from the laser oscillator. A focusing optical element focuses, when a workpiece is irradiated with the laser beam emitted from the process fiber, the laser beam on a plurality of spots in a unit area within a unit time, the unit area having a radius of 0.5 mm of an optical axis of the laser beam, and the unit time being a time from when the workpiece starts to melt to when the melting of the workpiece ends.

5 Claims, 10 Drawing Sheets

(51) Int. Cl.
*B23K 26/142* (2014.01)
*B23K 26/38* (2014.01)
*B23K 26/067* (2006.01)
*B23K 26/08* (2014.01)

(52) U.S. Cl.
CPC ...... *B23K 26/0648* (2013.01); *B23K 26/0665* (2013.01); *B23K 26/0676* (2013.01); *B23K 26/08* (2013.01); *B23K 26/142* (2015.10)

(56) References Cited

U.S. PATENT DOCUMENTS

| | | | |
|---|---|---|---|
| 2003/0055413 A1* | 3/2003 | Altshuler | A61B 18/203 606/9 |
| 2009/0032510 A1 | 2/2009 | Ando et al. | |
| 2009/0218326 A1* | 9/2009 | Chouf | B23K 26/0648 219/121.72 |
| 2009/0323753 A1 | 12/2009 | Gmeiner et al. | |
| 2010/0141729 A1 | 6/2010 | Petsch et al. | |
| 2011/0248005 A1* | 10/2011 | Briand | B23K 26/06 219/121.72 |
| 2012/0031883 A1* | 2/2012 | Kumamoto | B23K 26/0648 219/121.78 |
| 2013/0015168 A1* | 1/2013 | Nagahori | B23K 26/14 219/121.72 |
| 2013/0146573 A1* | 6/2013 | Hamaguchi | H01M 2/30 219/121.72 |
| 2013/0148925 A1* | 6/2013 | Muendel | G02B 6/32 385/27 |
| 2014/0076870 A1* | 3/2014 | Hirano | B23K 26/0604 219/121.75 |
| 2016/0263705 A1* | 9/2016 | Kim | B23K 26/38 |

FOREIGN PATENT DOCUMENTS

| | | |
|---|---|---|
| DE | 102007037133 | 3/2008 |
| JP | 2010-105037 | 5/2010 |
| JP | 2010-105046 | 5/2010 |
| JP | 2012-500350 | 1/2012 |
| JP | 2013-107124 | 6/2013 |
| JP | 2013-191712 | 9/2013 |
| WO | 2013/058072 | 4/2013 |

OTHER PUBLICATIONS

Rodrigues et al., "Laser Cutting with direct diode laser", May 2013, Elsevier, Physics Procedia 41, pp. 558-565.*
Wahab et al., "Optimization of Laser Cutting Quality with Design of Experiments", May 2014, Wiley-VCH, Laser Technik Journal, pp. 27-31.*
Office Action issued in China Counterpart Patent Appl. No. 201680033382.5, dated Jul. 5, 2018, along with an English translation thereof.
Official Communication issued in Japan Patent Application No. PCT/JP/2016/063041, dated Jun. 28, 2016.
Official Communication issued in European Patent Office (EPO) Patent Application No. 16807221.3, dated Sep. 21, 2018.

* cited by examiner

| INCIDENCE ANGLE θ (DEGREE) | ABSORPTION RATE Ab (%) | MAXIMUM ABSORPTION RATE-FOCUSED BEAM DIAMETER damax(mm) | Ab/damax |
|---|---|---|---|
| 78 | 42 | 1.06 | 0.38 |
| 80 | 41.2 | 0.88 | 0.47 |
| 82.5 | 38.8 | 0.66 | 0.59 |
| 83 | 38 | 0.61 | 0.62 |
| 85.6 | 31 | 0.38 | 0.82 |
| 87 | 25 | 0.26 | 0.96 |

LASER PROCESSING MACHINE AND LASER CUTTING METHOD

TECHNICAL FIELD

The present disclosure relates to a laser processing machine and a laser cutting method.

BACKGROUND ART

As a laser oscillator that emits a laser beam with which a laser processing machine cuts a material, various oscillators such as a $CO_2$ laser oscillator, a YAG laser oscillator, a disk laser oscillator, a fiber laser oscillator, or a direct diode laser oscillator (DDL oscillator) can be used.

CITATION LIST

Patent Literature

[PATENT LITERATURE 1] WO 2013/058072 A1

SUMMARY OF THE INVENTION

A $CO_2$ laser oscillator is large in size and requires high running costs. On the other hand, a fiber laser oscillator or a DDL oscillator is small in size and requires low running costs. Therefore, recently, a fiber laser oscillator or a DDL oscillator has been widely used in a laser processing machine.

In a case where oxide-free cutting is performed on sheet metal (in particular, stainless steel or aluminum) using assist gas such as nitrogen gas, when a case where the cutting is performed in a laser processing machine using a $CO_2$ laser oscillator is compared to the case where the cutting is performed in a laser processing machine using a fiber laser oscillator or a DDL oscillator, the cutting surface roughness in the former case is lower and the quality of the cutting surface in the former case is higher than those in the latter case. Furthermore, in the former case, the cutting surface roughness is substantially uniform irrespective of the sheet thickness. On the other hand, in the latter case, the cutting surface roughness deteriorates as the sheet thickness increases.

In addition, in the case where a thick sheet having a sheet thickness of 3 mm or more is cut by a laser processing machine using a fiber laser oscillator or a DDL oscillator, dross is formed and adheres to the sheet metal, and the quality of a cutting surface deteriorates, as an example.

In this way, a fiber laser oscillator or a DDL oscillator is small in size and requires low running costs, but has a defect in that the quality of the cutting surface is not good. Therefore, in the case where a high-quality cutting surface is required, a fiber laser oscillator or a DDL oscillator cannot be used.

A fiber laser oscillator or a DDL oscillator is a preferable example of a laser oscillator that excites a laser beam having a wavelength in a 1 µm band or a shorter wavelength band. The same will be applied to a case where a disk laser oscillator is used instead of a fiber laser oscillator or a DDL oscillator.

Therefore, the appearance of a laser processing machine is eagerly desired in which the quality of a cutting surface is high, even when a laser oscillator that excites a laser beam having a wavelength in a 1 µm band or a shorter wavelength band is used.

An object of an embodiment is to provide a laser processing machine and a laser cutting method which uses a laser oscillator that excites a laser beam having a wavelength in a 1 µm band or a shorter wavelength band, and in which the quality of a cutting surface can be improved as compared to that of the conventional art.

A first aspect of the embodiment provides a laser processing machine including: a laser oscillator configured to excite a laser beam having a wavelength in a 1 µm band or a shorter wavelength band; one process fiber configured to transmit the laser beam emitted from the laser oscillator; and a focusing optical element configured to focus, when a workpiece is irradiated with the laser beam emitted from the process fiber, the laser beam on a plurality of spots in a unit area within a unit time, the unit area having a radius of 0.5 mm of an optical axis of the laser beam, and the unit time being a time from when the workpiece starts to melt to when the melting of the workpiece ends.

In the laser processing machine, it is preferable that the focusing optical element does not individually control laser outputs at respective focusing points.

The laser processing machine may further include a collimator lens that collimates the laser beam emitted from the laser oscillator, and the focusing optical element may be a facet lens configured to focus the laser beam collimated by the collimator lens on the workpiece.

At this time, it is preferable that a plurality of planes having a polygonal shape with four or more sides are formed on a surface of the facet lens on which the laser beam is incident.

In the laser processing machine, the focusing optical element may condense the laser beam emitted from the laser oscillator on a plurality of spots in a fiber core of a beam transmitting fiber so as to focus the laser beam on a plurality of spots in the unit area.

In the laser processing machine, the focusing optical element may be a diffractive optical element or a focusing lens that is movable in a direction perpendicular to the optical axis of the laser beam.

A second aspect of the embodiment provides a laser cutting method including: emitting a laser beam from a laser oscillator that excites a laser beam having a wavelength in a 1 µm band or a shorter wavelength band; allowing one process fiber to transmit the laser beam emitted from the laser oscillator; and cutting a workpiece by allowing a focusing optical element to focus, when the workpiece is irradiated with the laser beam emitted from the process fiber, the laser beam on a plurality of spots in a unit area within a unit time, the unit area having a radius of 0.5 mm of an optical axis of the laser beam, and the unit time being a time from when the workpiece starts to melt to when the melting of the workpiece ends.

In the laser cutting method, it is preferable that, when the laser beam is focused on a plurality of spots in the unit area, laser outputs at respective focusing points are not individually controlled.

In the laser cutting method, it is preferable that, when the workpiece is melted by the laser beam, assist gas is supplied to the workpiece at an assist gas pressure of 2.0 MPa to 3.0 MPa.

In the laser cutting method, it is preferable that a beam parameter product is 23 mm mrad to 28 mm mrad.

In accordance with the laser processing machine and the laser cutting method according to the embodiment, the quality of a cutting surface can be significantly improved compared to the conventional art, even when a laser oscillator that excites a laser beam having a wavelength in a 1 μm band or a shorter wavelength band is used.

MODES FOR CARRYING OUT THE INVENTION

Hereinafter, a laser processing machine and a laser cutting method according to the embodiment will be described with reference to the accompanying drawings. In the embodiment, a case where a fiber laser oscillator or a DDL oscillator is used as a laser oscillator that excites a laser beam having a wavelength in a 1 μm band or a shorter wavelength band will be described.

Figure 1:
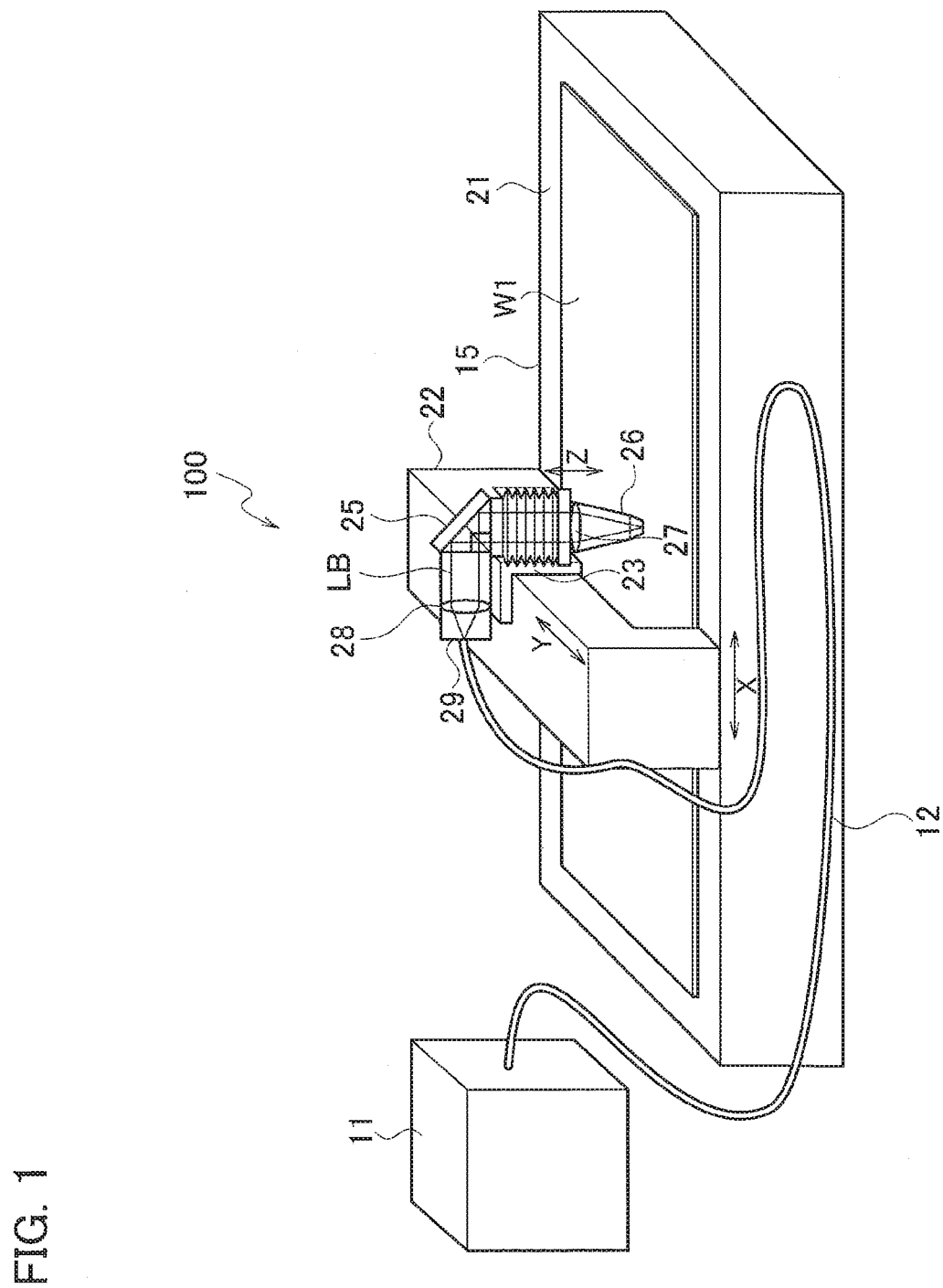
FIG. 1 is a perspective view illustrating an overall configuration example of a laser processing machine according to an embodiment.

In FIG. 1, a laser processing machine 100 includes: a laser oscillator 11 that generates and emits a laser beam LB; a laser processing unit 15; and a process fiber 12 that transmits the laser beam LB to the laser processing unit 15. The laser processing machine 100 cuts a sheet metal W1 as a workpiece using the laser beam LB emitted from the laser oscillator 11.

The laser oscillator 11 is a fiber laser oscillator or a direct diode laser oscillator (hereinafter, referred to as "DDL oscillator"). The process fiber 12 is mounted along cable ducts (not illustrated) of an X-axis and a Y-axis of the laser disposed in the laser processing unit 15.

The laser processing unit 15 includes: a processing table 21 on which the sheet metal W1 is placed; a gate type X-axis carriage 22 that is movable on the processing table 21 in an X-axis direction; and a Y-axis carriage 23 that is movable on the X-axis carriage 22 in a Y-axis direction perpendicular to the X-axis. In addition, the laser processing unit 15 includes a collimator unit 29 that is fixed to the Y-axis carriage 23.

The collimator unit 29 includes: a collimator lens 28 that collimates the laser beam LB emitted from an output end of the process fiber 12 to obtain a substantially parallel beam flux; and a bend mirror 25 that reflects the laser beam LB, which is converted into a substantially parallel beam flux, downward in a Z-axis direction perpendicular to the X-axis and the Y-axis. In addition, the collimator unit 29 includes: a focusing lens 27 that focuses the laser beam LB reflected from the bend mirror 25; and a processing head 26.

The collimator lens 28, the bend mirror 25, the focusing lens 27, and the processing head 26 are fixed into the collimator unit 29 in a state where an optical axis is adjusted in advance. In order to correct the focal point, the collimator lens 28 may be configured to be movable in the X-axis direction.

The collimator unit 29 is fixed to the Y-axis carriage 23 to be movable in the Y-axis direction, and the Y-axis carriage 23 is provided in the X-axis carriage 22 to be movable in the X-axis direction. Accordingly, the laser processing unit 15 can move to a position, where the sheet metal W1 is irradiated with the laser beam LB emitted from the processing head 26, in the X-axis direction and the Y-axis direction.

With the above-described configuration, the laser processing machine 100 transmits the laser beam LB emitted from the laser oscillator 11 to the laser processing unit 15 using the process fiber 12, and irradiates the sheet metal W1 with the laser beam LB to cut the sheet metal W1.

When the sheet metal W1 is cut, assist gas is jetted to the sheet metal W1 to remove molten material therefrom. FIG. 1 does not illustrate a configuration of jetting the assist gas.

Figure 2:
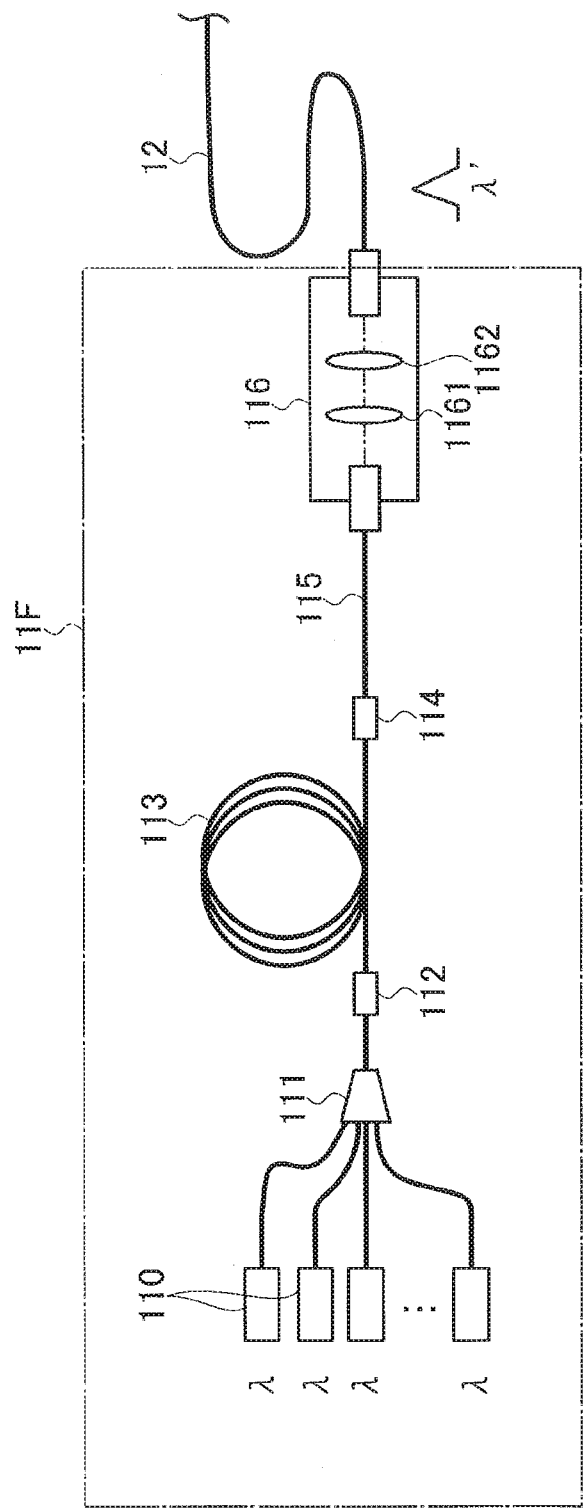
FIG. 2 is a diagram illustrating a schematic configuration in the case where a laser oscillator 11 illustrated in FIG. 1 is a fiber laser oscillator 11F.

FIG. 2 illustrates a schematic configuration in which the laser oscillator 11 is a fiber laser oscillator 11F. In FIG. 2, each of the plural laser diodes 110 emits a laser beam having a wavelength λ. An excitation combiner 111 spatially combines laser beams emitted from the laser diodes 110.

The laser beam emitted from the excitation combiner 111 is incident on an Yb-doped fiber 113 between two fiber Bragg gratings (FBGs) 112 and 114. The Yb-doped fiber 113 is a fiber with a rare earth Yb (ytterbium) element added to the core.

The laser beam incident on the Yb-doped fiber 113 repeatedly reciprocates between the FBGs 112 and 114 such that a laser beam having a wavelength $\lambda'$ (1 μm band) of 1060 nm to 1080 nm, which is different from the wavelength $\lambda$, is emitted from the FBG 114. The laser beam emitted from the FBG 114 is incident on the process fiber 12 through a feeding fiber 115 and a beam coupler 116. The beam coupler 116 includes lenses 1161 and 1162.

The process fiber 12 is configured as one optical fiber, and the laser beam transmitted from the process fiber 12 is not coupled with another laser beam until it is irradiated on the sheet metal W1.

Figure 3:
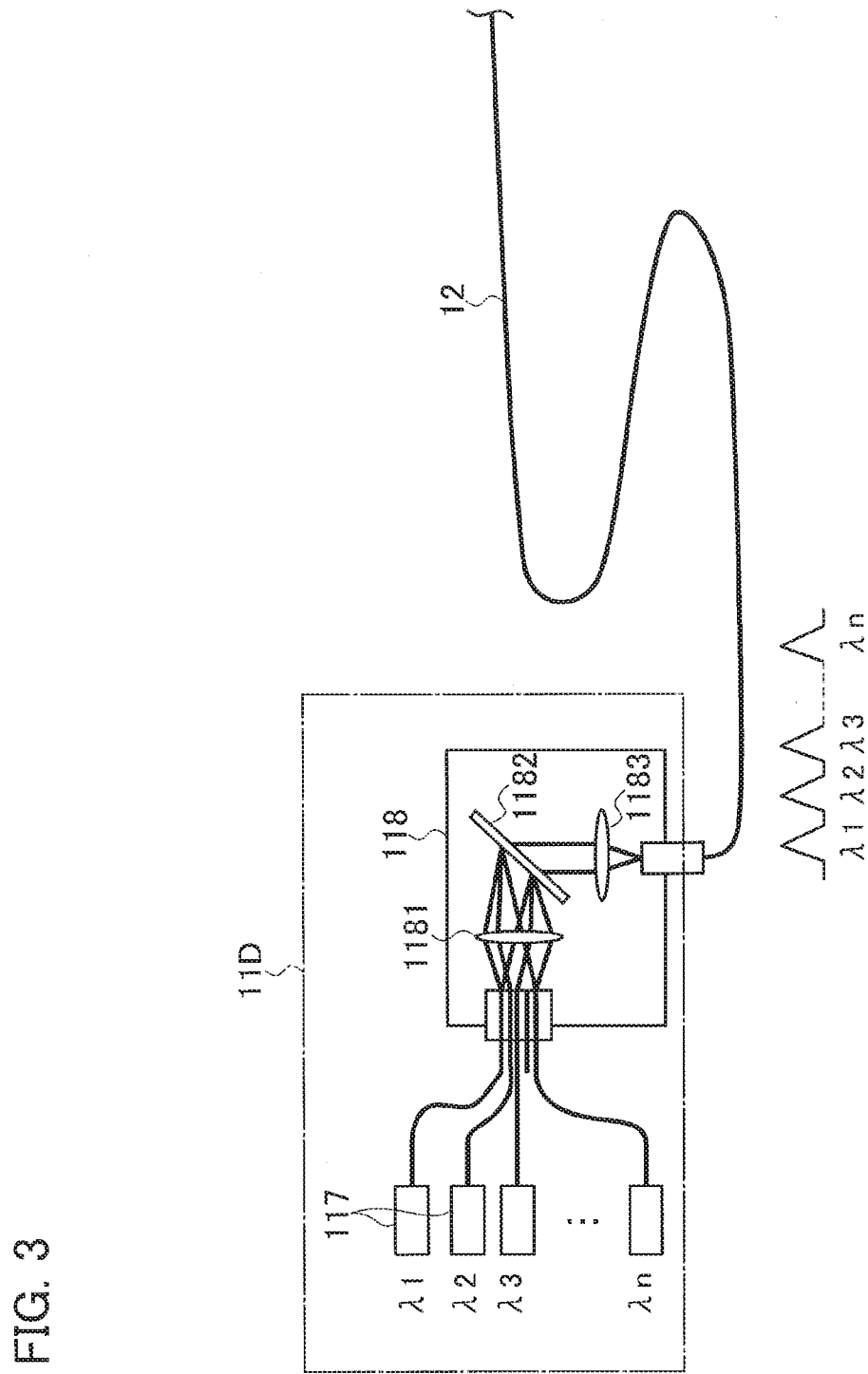
FIG. 3 is a diagram illustrating a schematic configuration in the case where the laser oscillator 11 illustrated in FIG. 1 is a direct diode laser oscillator 11D.

FIG. 3 illustrates a schematic configuration in a case where the laser oscillator 11 is a DDL oscillator 11D. In FIG. 3, laser beams having the different wavelengths $\lambda 1$ to $\lambda n$ are emitted from the plural laser diodes 117. The wavelengths $\lambda 1$ to $\lambda n$ (wavelength bands of shorter than 1 μm band) are in the range of 910 nm to 950 nm, for example.

An optical box 118 spatially combines the laser beams having the wavelengths $\lambda 1$ to $\lambda n$ emitted from the plural laser diodes 117. The optical box 118 includes a collimator lens 1181, a grating 1182, and a condensing lens 1183.

The collimator lens 1181 collimates the laser beams having the wavelengths $\lambda 1$ to $\lambda n$. The grating 1182 bends directions of the collimated laser beams by 90 degrees and allows the collimated laser beams to be incident on the condensing lens 1183. The condensing lens 1183 condenses the incident laser beams and allows the laser beams to be incident on the process fiber 12.

The process fiber 12 is configured as one optical fiber, and the laser beam transmitted from the process fiber 12 is not coupled with another laser beam until it is irradiated on the sheet metal W1.

Next, in the case where the fiber laser oscillator 11F or the DDL oscillator 11D is used, a method of improving the quality of the cutting surface of the sheet metal W1 will be described.

Figure 4:
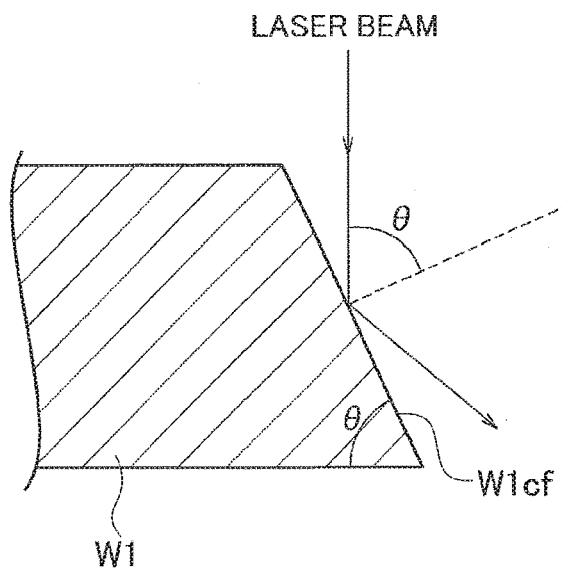
FIG. 4 is a cross-sectional view illustrating an incident angle at which a laser beam is incident on a cutting front of a sheet metal.

FIG. 4 schematically illustrates a state where a laser beam emitted from the top in a drawing is incident on and reflected from the cutting front W1cf of the sheet metal W1. An angle between an incident direction of the laser beam and a direction indicated by a broken line perpendicular to the cutting front W1cf is an incident angle θ of the laser beam. Assuming that the cutting front W1cf is an ideal plane, the angle between the bottom surface of the sheet metal W1 and the cutting front W1cf is the incident angle.

Figure 5:
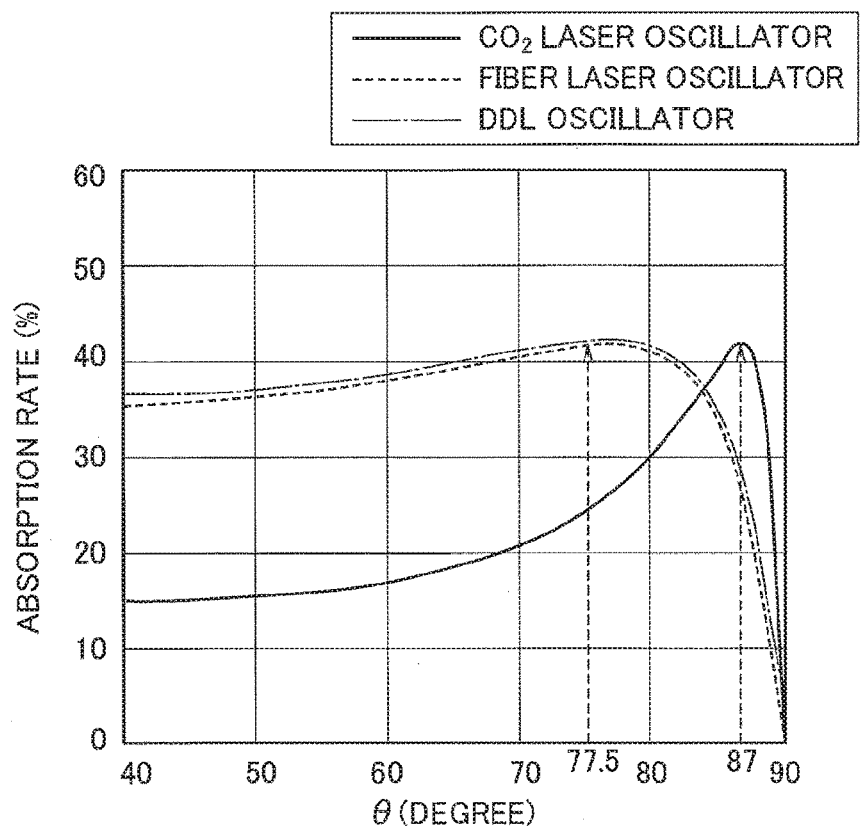
FIG. 5 is a characteristic chart illustrating a relationship between an incident angle with respect to a cutting front and an absorption rate of a laser beam when a $CO_2$ laser oscillator, the fiber laser oscillator 11F, or the DDL oscillator 11D is used as the laser oscillator 11.

FIG. 5 illustrates a relationship between the incident angle θ and an absorption rate of the laser beam when a $CO_2$ laser oscillator, the fiber laser oscillator 11F, or the DDL oscillator 11D is used as the laser oscillator 11. Here, the characteristic chart in which the sheet metal W1 is an iron-based material is illustrated.

As illustrated in FIG. 5, in a case where the $CO_2$ laser oscillator is used, the absorption rate is maximum at an incident angle θ of 87 degrees. In a case where the fiber laser oscillator 11F or the DDL oscillator 11D is used, the absorption rate is maximum at an incident angle θ of 77.5 degrees.

Figure 6:
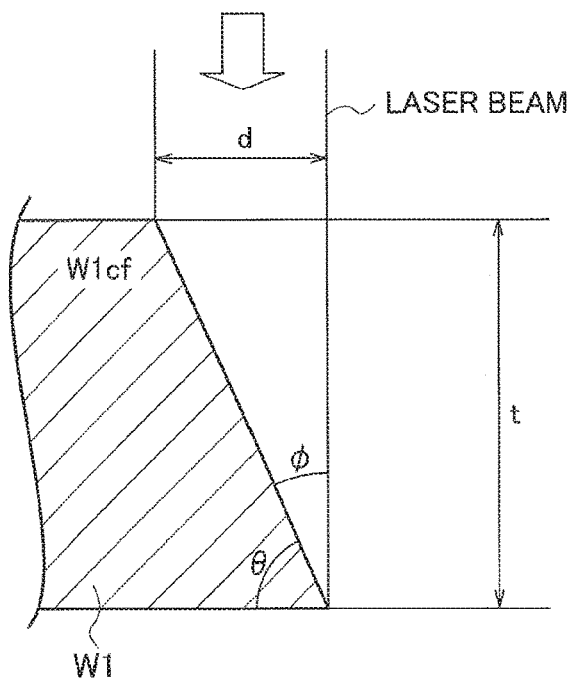
FIG. 6 is a conceptual diagram illustrating the state where a laser beam is incident on the entire area of the cutting front.

As illustrated in FIG. 6, the sheet thickness of the sheet metal W1 is represented by t, the focused beam diameter of the laser beam is represented by d, the angle between the laser beam and the cutting front W1cf is represented by φ, and it is assumed that the laser beam having the focused beam diameter d is incident on the entire area of the cutting front W1cf. At this time, Equation (1) is established. Note that $\varphi = 90 - \theta$.

$$d = t \times \tan \varphi \tag{1}$$

Figure 7:
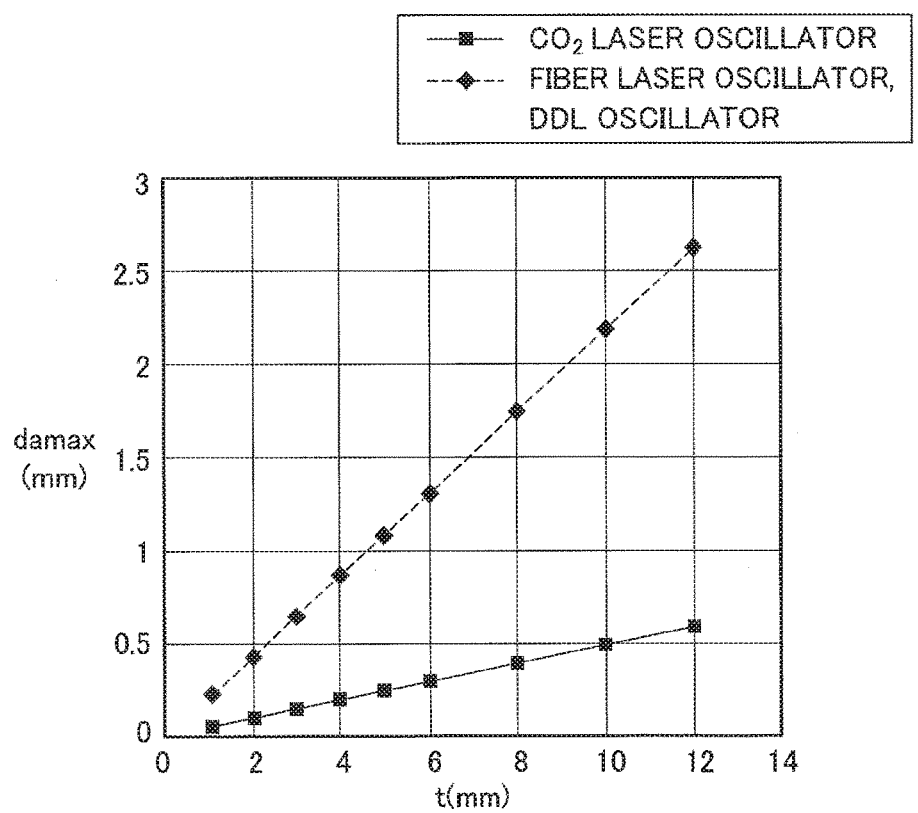
FIG. 7 is a characteristic chart illustrating a relationship between a sheet thickness t and a maximum absorption rate-focused beam diameter damax when the $CO_2$ laser oscillator, the fiber laser oscillator 11F, or the DDL oscillator 11D is used as the laser oscillator 11.

Based on FIG. 5, the relationship between the sheet thickness t and a focused beam diameter damax at which the absorption rate is maximum (hereinafter, referred to as the "maximum absorption rate-focused beam diameter damax") is obtained using Equation (1), and FIG. 7 illustrates the relationship. It can be seen from FIG. 7 that, in the case where the fiber laser oscillator 11F or the DDL oscillator 11D is used as the laser oscillator 11, the maximum absorption rate-focused beam diameter damax is about 4.2 times that of the case where a $CO_2$ laser oscillator is used as the laser oscillator 11.

However, in the case where the maximum absorption rate-focused beam diameter damax is excessively large, a sufficient power density cannot be secured at a processing point, and the cutting speed becomes slow.

Figure 8:
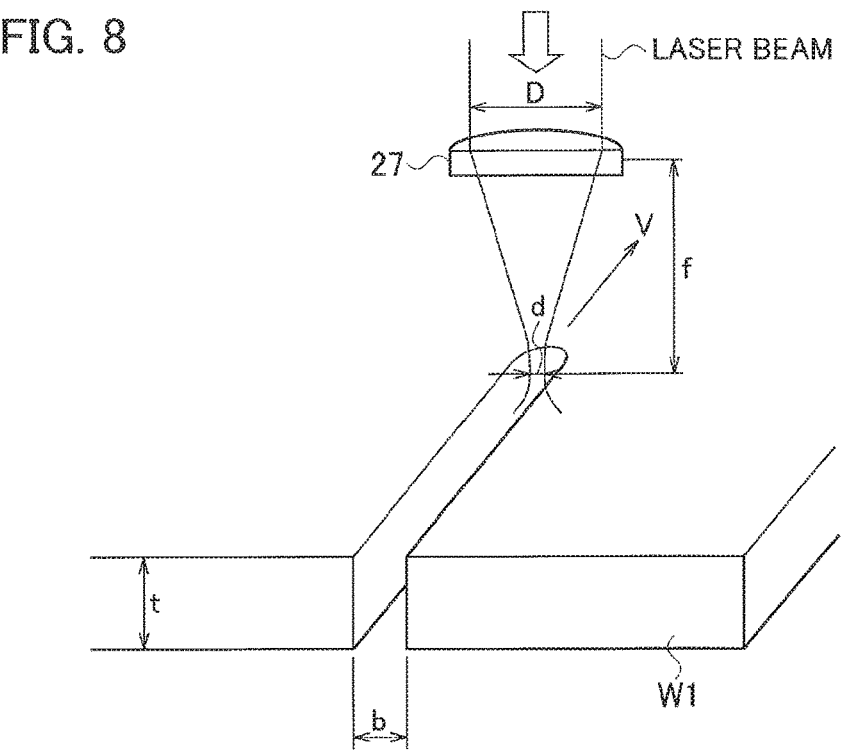
FIG. 8 is a perspective view schematically illustrating a cutting speed V at which a sheet metal is cut.

The cutting speed at which the sheet metal W1 is cut will be described using FIG. 8. In FIG. 8, an incident beam diameter of a laser beam incident on the focusing lens 27 is represented by D, and the sheet metal W1 is irradiated with the laser beam focused by the focusing lens 27.

Laser output (laser power) is represented by P (W) (W=J/s), absorption rate of the laser beam incident on the sheet metal W1 is represented by Ab, cut width is represented by b (mm), sheet thickness is represented by t (mm), and the energy at which the material is melted or evaporated is represented by E ($J/cm^3$). When the sheet metal W1 is cut by the laser beam, the cutting speed V (cm/s) is represented by Equation (2).

$$V = P \times Ab / (E \times b \times t) \tag{2}$$

In this case, it is assumed that all of the energies are absorbed by the cutting front W1cf of a cutting kerf, there is no loss in the thermal conduction of a material, and molten metal in the cutting kerf is completely discharged by assist gas.

In order to improve the quality of a cutting surface without adhesion of dross to the sheet metal W1, it is preferable that the pressure of assist gas (assist gas pressure) supplied to the sheet metal W1 is as high as possible. The assist gas pressure may be 2.0 MPa to 3.0 MPa, for example.

It can be seen from Equation (2) that the cutting speed V is in proportion to the absorption rate Ab and is in inverse proportion to the cut width b. As the focused beam diameter d decreases, the cut width b decreases.

Figure 9:
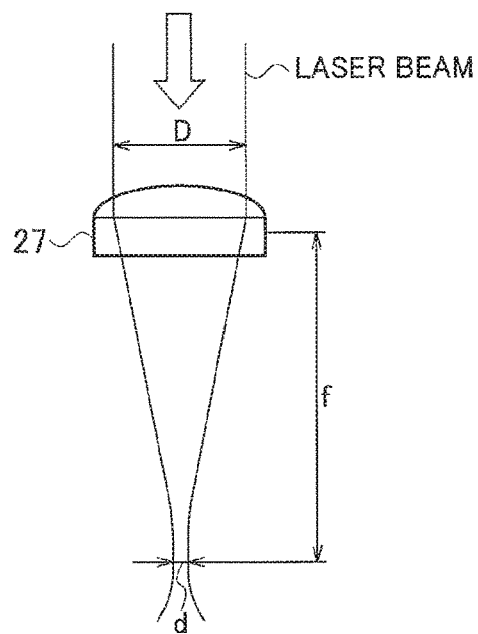
FIG. 9 is a diagram illustrating a method of calculating a focused beam diameter d.

A method of obtaining the focused beam diameter d will be described using FIG. 9. When the wavelength of the laser beam is represented by $\lambda$, the focal length of the focusing lens 27 is represented by f, and the beam parameter product is represented by BPP, the focused beam diameter d is represented by Equation (3).

$$d = (1.27 \times \pi \times f \times BPP)/D \tag{3}$$

BPP is the product of a divergence angle of the laser beam and a beam waist (beam diameter), and is an index indicating the quality of the laser beam. Typically, in the case where a well-formed Gaussian-shaped beam profile is ideal, the BPP value is preferably 1. However, it has been clarified that, in the case where a sheet metal is cut, in particular, a thick sheet having a sheet thickness of 3 mm or more is cut using a laser beam having a high energy density, the BPP value being similar to 1 does not necessarily lead to high-quality processing (processing with good surface roughness).

In the case where a thick sheet having a sheet thickness of 3 mm or more is cut, it is preferable that the beam diameter is as large as possible. In this case, it is preferable that BPP is 23 mm mrad to 28 mm mrad.

Figures 10, 11:
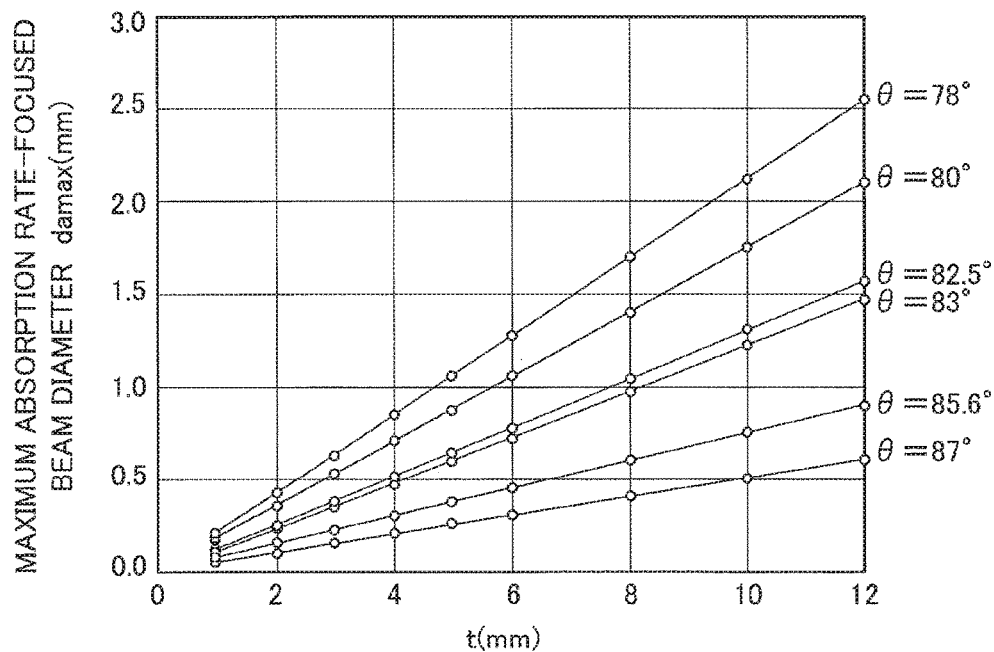
FIG. 10 is a table collectively illustrating an absorption rate Ab, the maximum absorption rate-focused beam diameter damax, and a cutting speed defining parameter Ab/damax at each of incident angles 78 degrees, 80 degrees, 82.5 degrees, 83 degrees, 85.6 degrees, and 87 degrees when the fiber laser oscillator 11F or the DDL oscillator 11D is used as the laser oscillator 11.
FIG. 11 is a characteristic chart collectively illustrating a relationship between a plurality of sheet thicknesses t and the maximum absorption rate-focused beam diameter damax at each of the incident angles 78 degrees, 80 degrees, 82.5 degrees, 83 degrees, 85.6 degrees, and 87 degrees when the fiber laser oscillator 11F or the DDL oscillator 11D is used as the laser oscillator 11.

The absorption rate Ab, the maximum absorption rate-focused beam diameter damax, and Ab/damax are obtained at a sheet thickness t of 5 mm and at each of incident angles 78 degrees, 80 degrees, 82.5 degrees, 83 degrees, 85.6 degrees, and 87 degrees when the fiber laser oscillator 11F or the DDL oscillator 11D is used as the laser oscillator 11, and FIG. 10 collectively illustrates the results. Ab/damax is an element for determining the cutting speed V and thus will be referred to a cutting speed defining parameter.

As illustrated in FIG. 5, the absorption rate Ab is maximum at an incident angle $\theta$ of 77.5 degrees, and as the incident angle $\theta$ increases, the absorption rate Ab decreases. However, as illustrated in FIG. 10, as the incident angle $\theta$ decreases from 87 degrees to 78 degrees, the cutting speed defining parameter Ab/damax decreases.

When the value of the cutting speed defining parameter Ab/damax is small, the power density of the laser beam is low, and a relatively long time is required to cut the sheet metal W1. When both the absorption rate Ab and the cutting speed defining parameter Ab/damax are taken into consideration, the incident angle $\theta$ is preferably about 83 degrees at a sheet thickness t of 5 mm as indicated by a thick solid line in FIG. 10.

Furthermore, a relationship between plural sheet thicknesses t and a maximum absorption rate-focused beam diameter damax is obtained at each of incident angles 78 degrees, 80 degrees, 82.5 degrees, 83 degrees, 85.6 degrees, and 87 degrees, and FIG. 11 illustrates the relationship.

Figure 12:
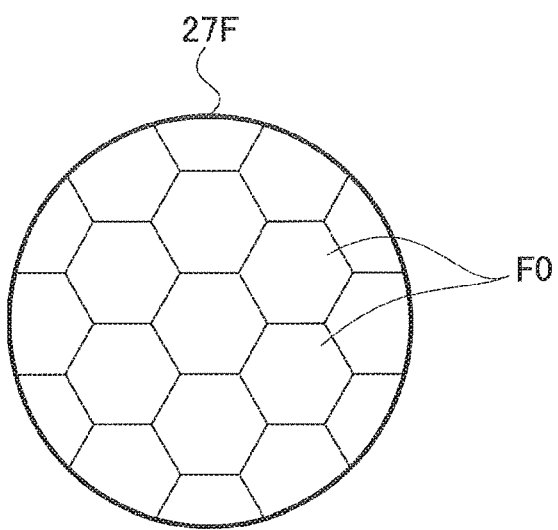
FIG. 12 is a plan view illustrating a configuration example of a facet lens.

Hereinafter, a preferable configuration for setting the maximum absorption rate-focused beam diameter damax to an appropriate value will be described. In the embodiment, a facet lens 27F illustrated in FIG. 12 is used as the focusing lens 27. In the facet lens 27F, plural planes F0 having a hexagonal shape are formed on the surface of a convex lens (a surface on which a laser beam is incident). In addition, the facet lens 27F has plural curves on one lens surface.

In FIG. 10, in order to set the maximum absorption rate-focused beam diameter damax to be 0.38 mm or less, a commonly used standard focusing lens is used as the focusing lens 27. In FIG. 10, in order to set the maximum absorption rate-focused beam diameter damax to be 0.61 mm or more, the facet lens 27F is preferably used as the focusing lens 27.

The facet lens 27F is an example of a focusing optical element that focuses, when a workpiece is irradiated with the laser beam emitted from the laser oscillator 11, the laser beam on plural spots in a unit area within a unit time, the unit area having a radius of 0.5 mm of an optical axis of the laser beam, and the unit time being a time from when the workpiece starts to melt to when the melting of the workpiece ends.

It is preferable that the focusing optical element focuses the laser beam on plural spots in a unit area within a unit time, the unit area having a radius of 0.4 mm of an optical axis of the laser beam, and the unit time being the time from when the workpiece starts to melt to when the melting of the workpiece ends. At this time, the focusing optical element does not individually control laser outputs at respective focusing points. Accordingly, there is no difference in beam intensity between the focusing points.

The laser processing machine according to the embodiment includes the focusing optical element and thus can cut a thick sheet having a sheet thickness of 3 mm or more with high quality.

For example, as a focusing condition 1, in order to set the maximum absorption rate-focused beam diameter damax to be 0.38 mm, a standard focusing lens having a focal length f of 190 mm can be used. As a focusing condition 2, in order to set the maximum absorption rate-focused beam diameter damax to be 0.61 mm, the facet lens 27F having a focal length f of 150 mm can be used. As a focusing condition 3, in order to set the maximum absorption rate-focused beam diameter damax to be 1.06 mm, the facet lens 27F having a focal length f of 190 mm can be used.

The facet lens 27F is not limited to the shape illustrated in FIG. 12, and may be configured to have plural planes having a quadrangular shape on the surface of a convex lens. The facet lens 27F is not particularly limited as long as plural planes having a polygonal shape with four or more sides are formed on the surface of the facet lens on which a laser beam is incident.

The plural planes formed on the surface of the facet lens 27F are formed so as to focus on different planar positions. Accordingly, the facet lens 27F functions to defocus the laser beam.

Accordingly, in the case where the facet lens 27F is used as the focusing lens 27, the focused beam diameter d can be widened as compared to the case where the standard focusing lens is used as the focusing lens. The facet lens 27F is preferably used to set the maximum absorption rate-focused beam diameter damax to be a relatively large appropriate value.

Figure 13:
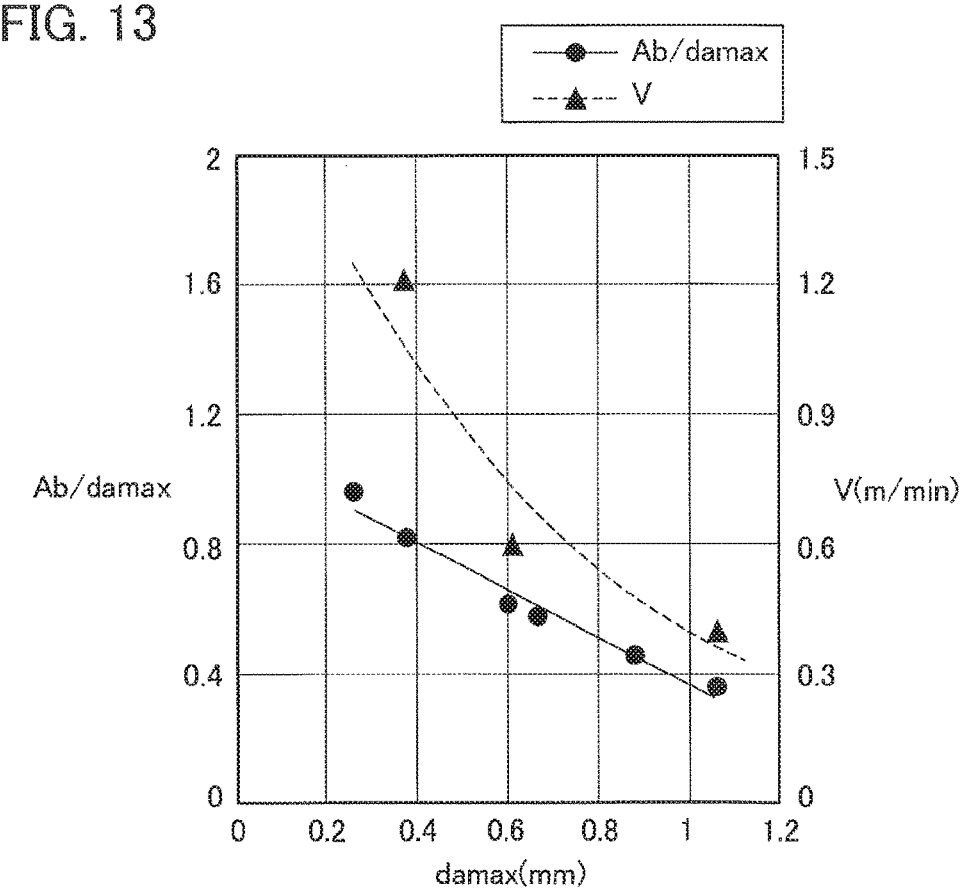
FIG. 13 is a characteristic chart illustrating a relationship between the maximum absorption rate-focused beam diameter damax and the cutting speed defining parameter Ab/damax, and a relationship between the maximum absorption rate-focused beam diameter damax and the cutting speed V.

FIG. 13 illustrates a relationship between a maximum absorption rate-focused beam diameter damax and a cutting speed defining parameter Ab/damax, and a relationship between a maximum absorption rate-focused beam diameter damax and the cutting speed V in each of the focusing conditions 1 to 3. The cutting speeds V are 1.2 m/min under the condensing condition 1, 0.6 m/min under the condensing condition 2, and 0.4 m/min under the condensing condition 3. As can be seen from FIG. 13, the slope of the cutting speed V is approximated to the slope of the cutting speed defining parameter Ab/damax.

Figure 14:
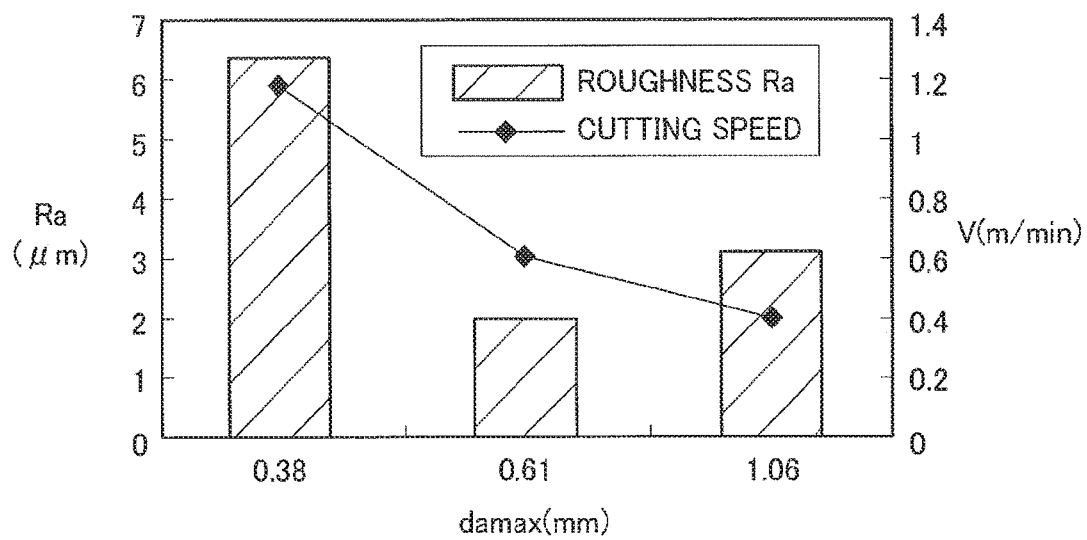
FIG. 14 is a characteristic chart illustrating a relationship between the maximum absorption rate-focused beam diameter damax and a cutting surface roughness Ra, and a relationship between the maximum absorption rate-focused beam diameter damax and the cutting speed V.

FIG. 14 illustrates a relationship between the maximum absorption rate-focused beam diameter damax and a cutting surface roughness Ra, and a relationship between the maximum absorption rate-focused beam diameter damax and the cutting speed V in each of the focusing conditions 1 to 3. FIG. 14 illustrates a case where a stainless steel sheet having a sheet thickness of 5 mm as the sheet metal W1 is cut by using the DDL oscillator 11D as the laser oscillator 11. The cutting surface roughness Ra may be an arithmetic average cutting surface roughness.

As can be seen from FIG. 14, under the focusing conditions 2 and 3 in which the facet lens 27F is used as the focusing lens 27, the cutting surface roughness Ra is significantly improved as compared to the focusing condition 1 in which the standard focusing lens is used as the focusing lens 27. In particular, under the focusing condition 2 in which the maximum absorption rate-focused beam diameter damax is 0.61 mm, the cutting surface roughness Ra is about 2 μm which is ⅓ or less that in the focusing condition 1.

Figure 15:
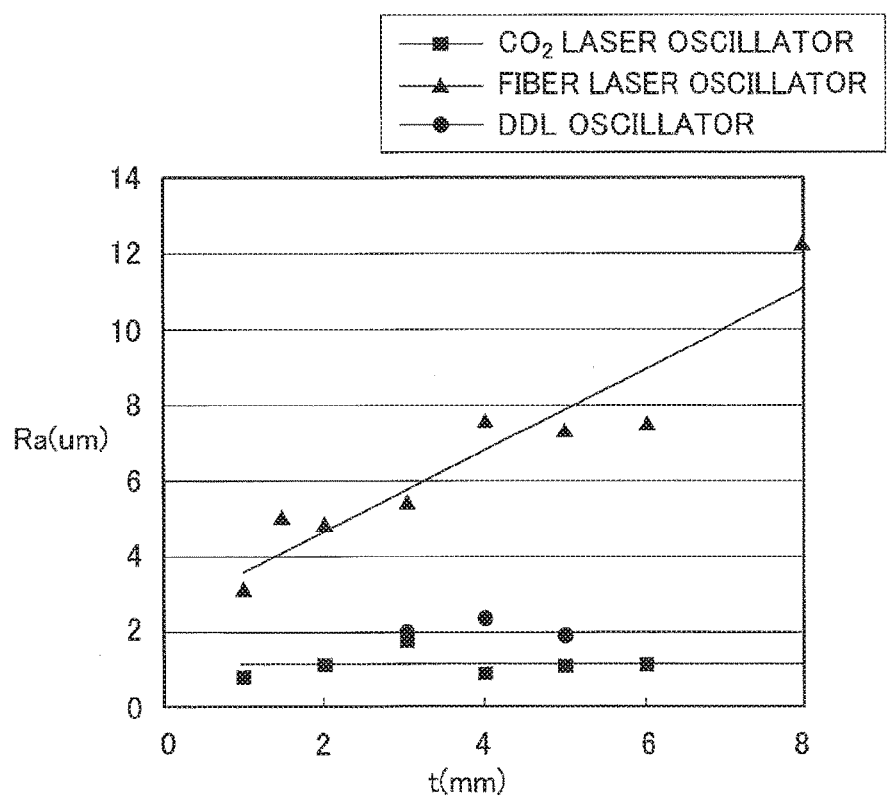
FIG. 15 is a characteristic chart illustrating a relationship between the sheet thickness t and the cutting surface roughness Ra regarding each of the laser processing machines according to the embodiment and a laser processing machine according to a comparative example.

FIG. 15 illustrates a cutting surface roughness Ra in the case where each stainless steel sheet having sheet thicknesses of 5 mm, 3 mm, and 4 mm as the sheet metals W1 is cut at a focused beam diameter d of 0.61 mm using a laser processing machine according to the embodiment in which the DDL oscillator 11D is used as the laser oscillator 11 and the facet lens 27F is used as the focusing lens 27. Here, the cutting surface roughness Ra may be an arithmetic average cutting surface roughness.

For comparison, FIG. 15 also illustrates a cutting surface roughness Ra in the case where each of the stainless steel sheets having plural sheet thicknesses t is cut using each of a laser processing machine in which a $CO_2$ laser oscillator and a standard focusing lens are used and a laser processing machine in which the fiber laser oscillator 11F and a standard focusing lens are used.

Although not illustrated in the drawing, in the case where each of the stainless steel sheets having plural sheet thicknesses t is cut using a laser processing machine according to the embodiment in which the fiber laser oscillator 11F and the facet lens 27F are used, the same characteristics as those in the embodiment in which the DDL oscillator 11D and the facet lens 27F are used are exhibited.

Conversely, in the case where each of the stainless steel sheets having plural sheet thicknesses t is cut using a laser processing machine in which the DDL oscillator 11D and a standard focusing lens are used, the same characteristics as those in the case in which the fiber laser oscillator 11F and a standard focusing lens are used are exhibited.

In the laser processing machine according to the embodiment in which the fiber laser oscillator 11F or the DDL oscillator 11D is used and the facet lens 27F is used as the focusing lens 27, the quality of the cutting surface can be significantly improved as compared to that of the conventional art although it is slightly lower than that of the laser processing machine in which the $CO_2$ laser oscillator is used.

According to the embodiment, even in the case where a high-quality cutting surface is required, a laser processing machine can be configured using the fiber laser oscillator 11F or the DDL oscillator 11D that is small in size and requires a low running cost.

The focusing optical element is not limited to the facet lens 27F. Two or more beam transmission paths (beam transmitting fibers) may be provided between the laser oscillator 11 and the processing head 26, and a beam coupler may be provided between the two fibers. A focusing lens in the beam coupler may be used as the above-described focusing optical element.

In this case, the focusing optical element condenses the laser beam emitted from the laser oscillator 11 on plural spots in a fiber core of a beam transmitting fiber so as to focus the laser beam on plural spots in the unit area.

Instead of the facet lens 27F, the focusing optical element may be a diffractive optical element or a focusing lens that is movable in a direction perpendicular to an optical axis.

In the case where the focusing optical element is a diffractive optical element, a diffractive optical element lens (DOE lens) may also be used, for example.

Figure 16:
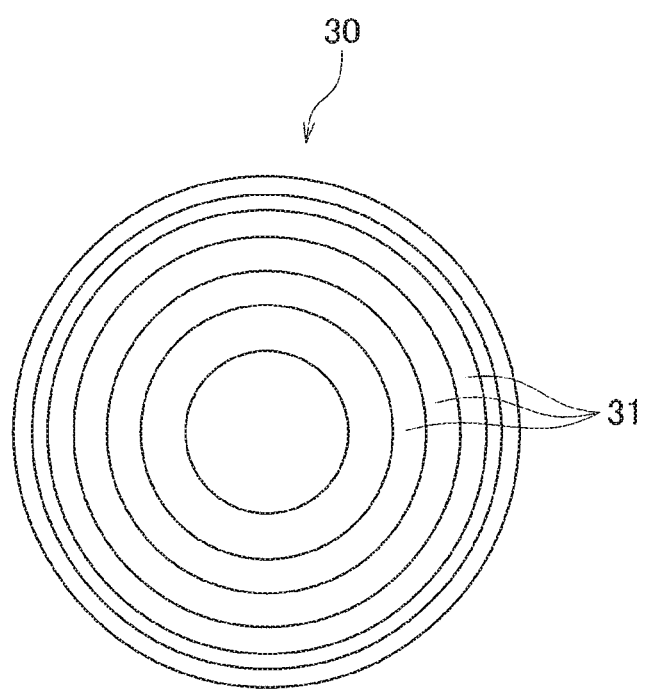
FIG. 16 is a plan view schematically illustrating a DOE lens.

FIG. 16 schematically illustrates a DOE lens 30. As illustrated in FIG. 16, the DOE lens 30 includes plural circumferential diffraction grooves 31. The DOE lens 30 may be used as the focusing lens 27 or the collimator lens 28. Although not illustrated in the drawing, a grating mirror may be used instead of the bend mirror 25.

In the case where the focusing optical element is a focusing lens that is movable in a direction perpendicular to an optical axis, the lens 1162 in FIG. 2 can function as a focusing lens, for example. That is, the function of the focusing optical element can be realized by eccentrically rotating the lens 1162 in a direction perpendicular to the optical axis, or by moving the lens 1162 up and down or back and forth in a direction perpendicular to the optical axis in FIG. 2.

The focusing optical element focuses the laser beam on plural spots in a unit area within a unit time, the unit area having a radius of 0.5 mm of an optical axis of the laser beam, and the unit time being the time from when the workpiece starts to melt to when the melting of the workpiece ends. By using this focusing optical element, the beam energy per unit time is substantially uniformly applied to the unit area. As a result, even a thick sheet having a sheet thickness of 3 mm or more can be cut with high quality.

By appropriately combining the wavelength, output, and energy density of a laser beam, the thickness and cut width of a workpiece, the laser-beam absorption rate of a workpiece, the cutting speed, the incident angle, the workpiece to be melted, and the kind and pressure of assist gas with each other, higher-quality cutting can be realized due to the synergistic effect.

In the above description, an iron-based material (stainless steel) is used as the sheet metal W1. However, even in the case where aluminum, titanium, or the like is used as the sheet metal, the quality of a cutting surface can be significantly improved with the laser processing machine and the laser cutting method according to the embodiment.

The present invention is not limited to the above-described embodiment, and various modifications can be made without departing from the scope of the invention. A disk laser oscillator may be used instead of the fiber laser oscillator or the DDL oscillator.

INDUSTRIAL APPLICABILITY

The present invention is applicable to the case where a workpiece is cut using a laser beam having a wavelength in a 1 μm band or a shorter wavelength band.

The invention claimed is:
1. A laser cutting method comprising:
emitting a laser beam from a laser oscillator that excites a laser beam having a wavelength of 1060 nm to 1080 nm or 910 nm to 950 nm;
allowing one process fiber to transmit the laser beam emitted from the laser oscillator;
melting a workpiece with the laser beam and supplying assist gas to the workpiece at an assist gas pressure of 2.0 MPa to 3.0 MPa; and
cutting the workpiece by allowing a focusing optical element to focus, when the workpiece is irradiated with the laser beam emitted from the process fiber, the laser beam on a plurality of spots in a unit area within a unit time, the unit area having a radius of 0.5 mm of an optical axis of the laser beam irradiated on the workpiece, and the unit time being a time from when the workpiece starts to melt to when the melting of the workpiece ends.

2. The laser cutting method according to claim 1, wherein a beam parameter product of the laser beam irradiated on the workpiece is 23 mm mrad to 28 mm mrad.

3. The laser cutting method according to claim 1, wherein when the laser beam is focused on a plurality of spots in the unit area, laser powers at respective focusing points are not individually controlled.

4. A laser cutting method comprising:
emitting a laser beam from a laser oscillator that excites a laser beam having a wavelength of 1060 nm to 1080 nm or 910 nm to 950 nm;

allowing one process fiber to transmit the laser beam emitted from the laser oscillator; and irradiating a workpiece with the laser beam having a beam parameter product of 23 mm mrad to 28 mm mrad so as to melt the workpiece; and cutting the workpiece by allowing a focusing optical element to focus, when the workpiece is irradiated with the laser beam emitted from the process fiber, the laser beam on a plurality of spots in a unit area within a unit time, the unit area having a radius of 0.5 mm of an optical axis of the laser beam irradiated on the workpiece, and the unit time being a time from when the workpiece starts to melt to when the melting of the workpiece ends.

5. The laser cutting method according to claim 4, wherein when the laser beam is focused on a plurality of spots in the unit area, laser powers at respective focusing points are not individually controlled.

* * * * *